(12) United States Patent
Sundararajan et al.

(10) Patent No.: US 11,885,198 B2
(45) Date of Patent: Jan. 30, 2024

(54) CHOKE SYSTEM WITH CAPACITY FOR PASSAGE OF LARGE DEBRIS

(71) Applicant: SRI ENERGY, INC., Sugar Land, TX (US)

(72) Inventors: Alagarsamy Sundararajan, Sugarland, TX (US); Purnima Vegesna, Missouri City, TX (US); Anand Parthasarathy, Cypress, TX (US); Aravindhan Rajamarthandan, Sugarland, TX (US)

(73) Assignee: SRI ENERGY, INC., Sugar Land, TX (US)

( * ) Notice: Subject to any disclaimer, the term of this patent is extended or adjusted under 35 U.S.C. 154(b) by 110 days.

(21) Appl. No.: 17/608,795

(22) PCT Filed: Jun. 29, 2021

(86) PCT No.: PCT/US2021/039510
§ 371 (c)(1),
(2) Date: Nov. 4, 2021

(87) PCT Pub. No.: WO2022/006045
PCT Pub. Date: Jan. 6, 2022

(65) Prior Publication Data
US 2023/0151889 A1    May 18, 2023

Related U.S. Application Data

(60) Provisional application No. 63/046,529, filed on Jun. 30, 2020.

(51) Int. Cl.
*F16K 1/42*    (2006.01)
*F16K 1/46*    (2006.01)
(Continued)

(52) U.S. Cl.
CPC .......... *E21B 34/025* (2020.05); *E21B 21/106* (2013.01); *F16K 1/422* (2013.01); *F16K 1/465* (2013.01); *F16K 27/02* (2013.01)

(58) Field of Classification Search
CPC .......... F16K 1/422; F16K 1/465; F16K 27/02; E21B 34/025; E21B 21/106
See application file for complete search history.

(56) References Cited

U.S. PATENT DOCUMENTS

| 3,026,084 A | 3/1962 | Bryant |
| 3,538,938 A | 11/1970 | Volpin |

(Continued)

FOREIGN PATENT DOCUMENTS

| CN | 104089027 A | 10/2014 |
| DE | 3717128 A1 | 12/1988 |

(Continued)

OTHER PUBLICATIONS

Patent Cooperation Treaty, International Search Report dated Oct. 19, 2021 in International Patent Application No. PCT/US2021/039510 (12 pages).

(Continued)

*Primary Examiner* — Marina A Tiet Jen
(74) *Attorney, Agent, or Firm* — Trop, Pruner & Hu, P.C.

(57) ABSTRACT

Embodiments include a choke system that passes enlarged debris despite having a relatively small diameter for an input port of the choke system. Embodiments also include systems to prevent dislodging of a choke seat when backpressure is supplied to the choke system. Embodiments also include sealing systems to prevent fluid leaks around the choke seat of the choke system.

25 Claims, 12 Drawing Sheets

(51) Int. Cl.
  *E21B 21/10* (2006.01)
  *E21B 34/02* (2006.01)
  *F16K 27/02* (2006.01)

(56) References Cited

U.S. PATENT DOCUMENTS

| | | | |
|---|---|---|---|
| 3,780,982 | A | 12/1973 | Kemp |
| 3,880,399 | A | 4/1975 | Luthe |
| 4,029,294 | A | 6/1977 | McCaskill et al. |
| 4,264,054 | A | 4/1981 | Morrill |
| 4,337,788 | A | 7/1982 | Seger |
| 4,493,336 | A | 1/1985 | Renfro |
| 4,540,022 | A | 9/1985 | Cove |
| 4,971,099 | A | 11/1990 | Cyvas |
| 5,074,519 | A | 12/1991 | Pettus |
| 5,133,383 | A | 7/1992 | King |
| 5,542,645 | A | 8/1996 | Beson |
| 5,706,856 | A | 1/1998 | Lancaster |
| 5,758,692 | A | 6/1998 | Crane |
| 5,957,208 | A | 9/1999 | Schnatzmeyer |
| 6,105,614 | A | 8/2000 | Bohaychuk et al. |
| 6,536,473 | B2 | 3/2003 | Bohaychuk |
| 6,782,949 | B2 | 8/2004 | Cove et al. |
| 7,237,472 | B2 | 7/2007 | Cove |
| 7,287,739 | B2 | 10/2007 | Arnison et al. |
| 7,308,902 | B2 | 12/2007 | Williams et al. |
| 7,469,720 | B2 | 12/2008 | McCulloch et al. |
| 8,171,958 | B2 | 5/2012 | Morreale |
| 8,371,333 | B2 | 2/2013 | Bohaychuk |
| 8,490,652 | B2 | 7/2013 | Bohaychuk et al. |
| 9,458,941 | B2 | 10/2016 | Bohaychuk |
| 10,197,077 | B2 | 2/2019 | Sundararajan et al. |
| 10,753,508 | B1 | 8/2020 | Corte, Jr. |
| 2006/0011236 | A1 | 1/2006 | Suter et al. |
| 2007/0215387 | A1 | 9/2007 | Sims et al. |
| 2008/0060704 | A1 | 3/2008 | McCarty |
| 2009/0320931 | A1 | 12/2009 | Wears |
| 2012/0181470 | A1 | 7/2012 | King et al. |
| 2015/0292629 | A1 | 10/2015 | Elliott et al. |
| 2016/0010754 | A1 | 1/2016 | Minnock et al. |
| 2016/0108699 | A1 | 4/2016 | Martino et al. |
| 2016/0186876 | A1 | 6/2016 | Topper |
| 2016/0223089 | A1 | 8/2016 | Nijland |
| 2016/0327165 | A1 | 11/2016 | Sundararajan |
| 2017/0051845 | A1 | 2/2017 | Bohaychuk et al. |
| 2019/0106963 | A1 | 4/2019 | Gray et al. |
| 2020/0318746 | A1 | 10/2020 | Parthasarathy et al. |
| 2020/0340595 | A1* | 10/2020 | McEvoy ............... F16K 31/047 |

FOREIGN PATENT DOCUMENTS

| | | |
|---|---|---|
| DE | 10004913 A1 | 8/2001 |
| EP | 2042685 B1 | 8/2012 |
| GB | 2094861 A | 9/1982 |
| GB | 2533636 A | 6/2016 |
| GB | 2533638 A | 6/2016 |
| WO | 2013103715 A1 | 7/2013 |

OTHER PUBLICATIONS

"About Smalley Retaining Rings & Snap Rings", downloaded Jun. 24, 2021, https://www.smalley.com/retaining-rings.

Expro International Group LTD, "Model SCB4 All-Purpose 4" Choke", PowerChokes, Revision 2.0, Jun. 2020.

"What you Need to Know About Dynamic Seal Applications", Apple Rubber, Hot Topics, Mar. 25, 2016, downloaded from https://www.applerubber.com/hot-topics-for-engineers/what-you-need-to-know-about-dynamic-seal-applications/.

"Control Chokes—External Sleeve," In Line Valve Co. Ltd., downloaded Nov. 9, 2017 from http://inlinevalve.co.uk/external_sleeve.htm, 2 pages.

"Valves," MSP/DRILEX, Inc., http://msp-drilex.US.com/valve.html, 2011, 7 pages.

The International Searching Authority, Notification of Transmittal of the International Search Report and the Written Opinion of the International Searching Authority as dated Feb. 27, 2018 in International Application No. PCT/US/2017/060779, 20 pages.

United States Patent Office, Non-Final Office Action dated May 10, 2018 in U.S. Appl. No. 15/807,972 (21 pages).

* cited by examiner

CHOKE SYSTEM WITH CAPACITY FOR PASSAGE OF LARGE DEBRIS

PRIORITY CLAIM

This application claims priority to U.S. Provisional Patent Application No. 63/046,529 filed on Jun. 30, 2020 and entitled "Choke System with Capacity for Passage of Enlarged Debris", the content of which is hereby incorporated by reference.

TECHNICAL FIELD

Embodiments of the invention are in the field of oil field equipment and, in particular, choke systems.

BACKGROUND

A "choke" is a device incorporating an orifice that is used to control fluid flow rate or downstream system pressure. Chokes are available in several configurations for both fixed and adjustable modes of operation. Adjustable chokes enable the fluid flow and pressure parameters to be changed to suit process or production requirements. Fixed chokes do not provide this flexibility, although they are more resistant to erosion under prolonged operation or production of abrasive fluids.

More specifically, an adjustable choke is a valve usually used in well control operations to reduce the pressure of a fluid from high pressure in the closed wellbore to atmospheric pressure. It may be adjusted (opened or closed) to closely control the pressure drop. Adjustable choke valves are constructed to resist wear while high-velocity, solids-laden fluids are flowing by the restricting or sealing elements.

More specifically, a fixed choke is a device used to control the flow of fluids by directing flow through a restriction or hole of a fixed size. The fluid characteristics and the pressure differential across the choke determine the flow rate through a fixed choke.

A "bean choke" is a fixed choke used to control the flow of fluids, usually mounted on or close to the Christmas tree. A bean choke contains a replaceable insert, or bean, made from hardened steel or similar durable material. The insert is manufactured with a precise diameter hole that forms the choke through which all fluids must pass. Choke inserts are available in a complete range of sizes, generally identified by choke diameter stated in 64ths of an inch; for example, a "32 bean" is equivalent to a ½-in. choke diameter.

A "choke line" is a high-pressure pipe leading from an outlet on the blow out preventer (BOP) stack to the back-pressure choke and associated manifold. During well-control operations, the fluid under pressure in the wellbore flows out of the well through the choke line to the choke, reducing the fluid pressure to atmospheric pressure. In floating offshore operations, the choke and kill lines exit the subsea BOP stack and then run along the outside of the drilling riser to the surface. The volumetric and frictional effects of these long choke and kill lines must be considered to control the well properly.

A "choke manifold" includes a set of high-pressure valves and associated piping that usually includes at least two adjustable chokes, arranged such that one adjustable choke may be isolated and taken out of service for repair and refurbishment while well flow is directed through the other one.

BRIEF DESCRIPTION OF THE DRAWINGS

Features and advantages of embodiments of the present invention will become apparent from the appended claims, the following detailed description of one or more example embodiments, and the corresponding figures. Where considered appropriate, reference labels have been repeated among the figures to indicate corresponding or analogous elements.

DETAILED DESCRIPTION

Figure 1:
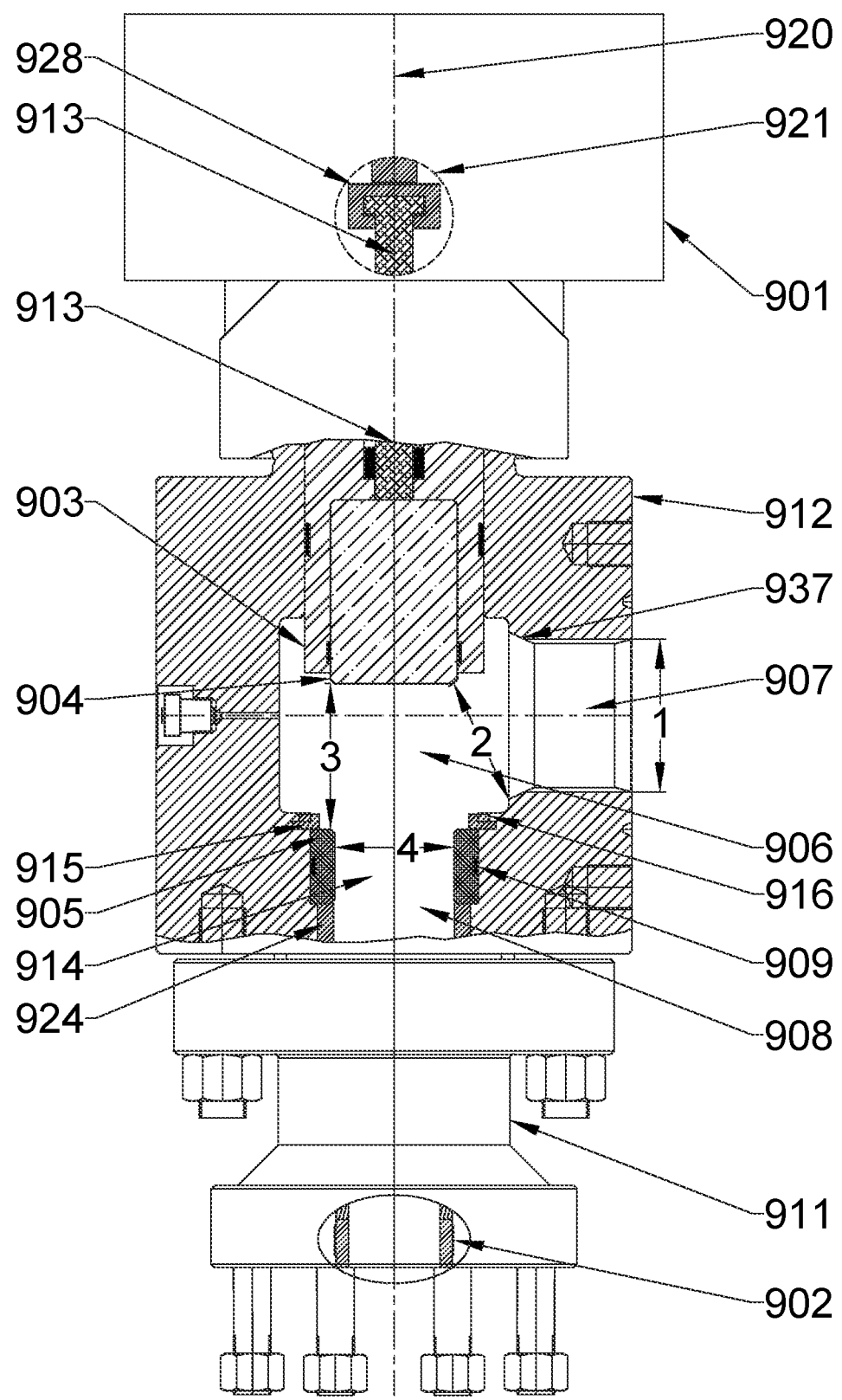
FIG. 1 is a cross-sectional side view of a choke system in an embodiment.

Reference will now be made to the drawings wherein like structures may be provided with like suffix reference designations. In order to show the structures of various embodiments more clearly, the drawings included herein are diagrammatic representations of structures. Thus, the actual appearance of the fabricated structures, for example in a photo, may appear different while still incorporating the claimed structures of the illustrated embodiments. Moreover, the drawings may only show the structures useful to understand the illustrated embodiments. Additional structures known in the art may not have been included to maintain the clarity of the drawings. "An embodiment", "various embodiments" and the like indicate embodiment(s) so described may include particular features, structures, or characteristics, but not every embodiment necessarily includes the particular features, structures, or characteristics. Some embodiments may have some, all, or none of the features described for other embodiments. "First", "second", "third" and the like describe a common object and indicate different instances of like objects are being referred to. Such adjectives do not imply objects so described must be in a given sequence, either temporally, spatially, in ranking, or in any other manner "Connected" may indicate elements are in direct physical or electrical contact with each other and "coupled" may indicate elements co-operate or interact with each other, but they may or may not be in direct physical or electrical contact.

Applicant determined conventional choke systems are often inefficient, which results in undesirable manufacturing and/or operating costs. For example, many components are built larger than necessary with conventional choke systems. With many conventional systems dimension 1 of FIG. 1 may be 7 inches in order to accommodate relatively large debris (e.g., 3.5 inch debris). However, dimension 2 may be much smaller (e.g., less than 3.75 inches) than dimension 1. Further, dimension 3 may be less than 4.5 inches with the possible motivation being that a relatively short stroke length (i.e., dimension 3) results in faster opening/closing of the choke. Further, dimension 4 may be about 6 inches when dimension 1 is 7 inches. When dimension 1 is only 5 inches, dimensions 2, 3, and 4 are all reduced or lower than the values shown immediately above.

In contrast to such conventional choke systems, embodiments described herein accommodate a relatively reduced dimension 1 and relatively increased dimensions 2 and/or 3 to thereby allow larger debris to pass through the choke while still reducing dimension 1 and providing acceptable fluid dynamics within the choke system. The increase in dimension 3 runs countercurrent to conventional norms that attempt to decrease dimension 3. Embodiments disclosed herein provide economic advantages during manufacture and/or operation of the system. For example, allowing dimension 1 to be reduced to 5" while still passing relatively large debris (e.g., 3.5 inch debris, which conventional systems may use a system with dimension 1=7 inches to pass such large debris) allows the operator to use smaller conduits/piping/lines to interface the choke, which can in turn reduce costs for operation of the system. In such a system, a 5 inch choke (dimension 1=5 inches) may be able to pass the same size debris as a conventional 6 inch choke (dimension 1=6 inches).

An embodiment includes a choke system whereby dimension 1 is about 5 inches in maximum breadth, dimension 2 is greater than 3.75 inches (e.g., 3.8 inches), dimension 4 is about 4 inches, and dimension 3 is more than 4.25 inches. As used herein, "about" equals plus or minus 10 percent. Thus, "about 4 inches" includes a range between 3.6 to 4.4 inches.

Thus, to accommodate larger debris, conventional systems increase dimension 1 along with an increase in dimension 4. In other words, in conventional systems practitioners fail to even appreciate that dimension 1 is not a result-effective variable but that dimensions 2 and 3 are result-effective variables. However, embodiments described herein recognize dimensions 2 and 3 are result-effective variables while not unnecessarily increasing dimension 1. This provides results (e.g., ability to pass larger debris without necessitating larger lines to input and output from the choke and while maintaining acceptable fluid dynamics (Cv)) not obtained by merely increasing dimensions 1 and 4. Such art is often silent regarding one or both of dimensions 2 and 3 and certainly fail to note the criticality of dimensions 2 and 3 upon governing the size of debris that can pass through the choke system. Embodiments that focus on particular ranges for dimensions 1, 2, 3, and 4 achieve unexpected results relative to the prior art range (e.g., ability to pass larger debris without necessitating larger lines to input and output from the choke and while maintaining acceptable fluid dynamics (Cv)). For example, such unexpected results include passing debris having a diameter of 3.5 to 3.8 inches despite dimension 1 being only 5 inches—all without resorting to use of input and/or output lines that are overly large (e.g., 7 inches) and therefore overly expensive or input and/or output lines that are non-standard (e.g., 6 inches) which create complications with components such as upstream/downstream gate valves.

FIG. 1 shows an embodiment with a choke system comprising choke body 912. The choke body includes input channel 907, body channel 906, and output channel 908. The choke further includes seat 905, which includes seat channel 914. The seat channel includes an upper border and a lower border. The choke includes gate 904, which has an upper border and a lower border. The lower border of the gate is configured to engage the seat when the gate is fully closed to block fluid flow through the seat channel. The choke system includes valve stem 913, which is coupled to a top surface of the gate. The body channel couples the input channel to the seat channel, and the seat channel couples the body channel to the output channel. Other system components include operator 901, lock wear ring 902 (which is addressed further below), bonnet/bonnet extension 903, seat seal assembly 909 (which is addressed further below), and outlet connection 911.

The choke system is configured to convey fluid through the body channel and the seat channel when the gate is open and fluid is pressurized in the input channel. The choke system is further configured to prevent the conveyance of fluid through the body channel and the seat channel when the gate is closed and the gate contacts the seat.

The input channel includes an entry and an exit and the input channel exit is between the body channel and the entry of the input channel. In the embodiment of FIG. 1 the entry to the input channel is coterminous with the sidewall of the choke body and the exit of the input channel is coterminous with where the chamfered edge 937 interfaces an interior wall of channel 906 (i.e., the chamfered edge is included within the input channel). The entry of the input channel is about 5 inches in maximum breadth 1 in an embodiment.

The exit of the input channel includes an upper border and a lower border and the lower border of the input channel is between the upper border of the input channel and the output channel. The upper and lower borders interface internal walls of channel 906. Minimum distance 2 exists between the lower border of the exit of the input channel and the lower border of the gate when the gate is fully open, the minimum distance being greater than 3.75 inches. Minimum distance 2 is the shortest breadth of the channel portion existing between the gate and input channel exit. Minimum distance 2 is the smallest space through which debris must pass when traversing the choke system. Applicant determined distance 2 is a result-effective variable more so than distance 1.

The seat channel has a diameter or breadth 4 of about 4 inches. The upper border of the seat channel is between the valve stem and the lower border of the seat channel. In FIG. 1, the upper border of the seat channel contacts an underside of ring 915. When the gate is fully open the lower border of the gate is more than 4.25 inches (see dimension 3) from the upper border of the seat channel.

Thus, by providing critical dimensions, such as dimensions 1, 2, 3, and 4, an embodiment is able to pass relatively larger debris despite its relatively modest intake dimension 1. For example, despite having dimension 1 at about 5 inches, the above embodiment can pass the same (e.g., 3.5 inches) or larger (e.g., 3.8 inches) debris as larger conventional systems having a dimension 1 of 6 or 7 inches.

Of course, other dimension combinations are possible. For example, enlarging dimension 2 and/or 3 with regard to dimension 1 allows for relatively larger debris to pass through the choke. Other embodiments include dimension 1 being 3, 4, 6, 7, 8 or more inches, dimension 2 being 3.4, 3.5, 3.6, 3.7, 3.8, 3.9 or more inches, dimension 3 being 4.0, 4.1, 4.2, 4.3, 4.4, 4.5, 4.6, 4.7, 4.8 or more inches, and dimension 4 being 3.5, 3.6, 3.7, 3.8, 3.9, 4.1, 4.2, 4.3, 4.4 or more inches. By adjusting each of dimensions 1, 2, 3, 4 with regard to the size of debris to be passed, dimensions of lines such as those coupling to elements 907, 902 may be economically reduced.

Figure 9:
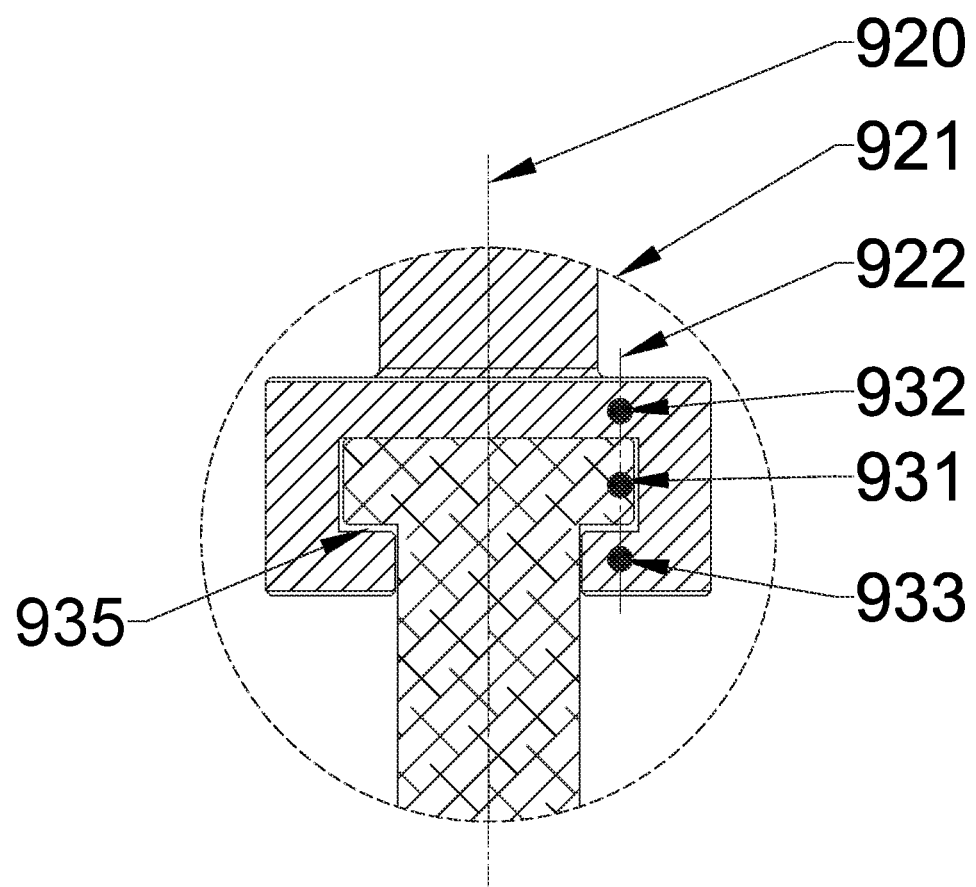
FIG. 9 is a cross-sectional side view of a valve stem/valve stem extension coupling in an embodiment.

In an embodiment the system of FIG. 1 includes a valve stem extension and stem coupling 921 that couples the valve stem extension to valve stem 913. The valve stem includes an upper end and a lower end, the lower end of the valve stem being between the upper end of the valve stem and the gate. The valve stem extension includes an upper end and a lower end, the lower end of the valve stem extension being between the upper end of the valve stem extension and the gate. The stem coupling is not threaded. See, for example, the "T" joint of FIG. 1. See also FIG. 9.

In an embodiment, stem coupling 921 includes the upper end of the valve stem and the lower end of the valve stem extension. The stem coupling allows the upper end of the valve stem to dynamically engage the lower end of the valve stem extension. See, for example, the "T" joint of FIG. 1. In other words, the "dynamic" nature allows "give" or some movement, unlike a "static" coupling such as a threaded coupling.

In an embodiment, the valve stem includes long axis 920. Additional axis 922 is parallel to the long axis. Additional axis 922 intersects the upper end of the valve stem at a first location 931 and the lower end of the valve stem extension at second 932 and third 933 locations with the first location being between the second and third locations. See, for example, the "T" joint of FIG. 1. In such a situation, the "T" may be formed on the valve stem instead of on the valve stem extension.

Stem 913 is "floating" or "dynamically engaged" because "T" member 921 inserts into slot 935 of stem extension 928 with a coupling that allows the stem some movement (i.e., to float or be dynamic). This helps alleviate concerns with imprecisely aligned stem and stem extension components. For example, when elements 913 and 928 are threaded together but not well aligned along axis 920 this can cause undesirable resistance (e.g., within bonnet extension 903) when opening/closing the choke.

In an embodiment the valve stem includes a long axis and an additional axis is parallel to the long axis. The additional axis intersects the lower end of the valve stem extension at a first location and the upper end of the valve stem at second and third locations. The first location is between the second and third locations. In such a situation, the "T" may be formed on the valve stem extension instead of on the valve stem.

In an embodiment, the exit of the input channel includes a chamfered edge. See, for example, edge 937. This further facilitates passage of large debris through the choke.

In an embodiment the choke is configured to pass debris having a maximum width of over 4.5 inches when the gate is open.

The system of FIG. 1 may be modified or configured in various ways to provide numerous embodiments.

In a version of the embodiment of FIG. 1 a choke system comprises choke body 912, which includes input channel 907, body channel 906, and output channel 908. Seat 605 includes seat channel 914, the seat channel including an upper border and a lower border. Gate 904 has an upper border and a lower border, the lower border of the gate being configured to engage the seat when the gate is fully closed to block fluid flow through the seat channel. Valve stem 913 is coupled to a top surface of the gate. The body channel couples the input channel to the seat channel, and the seat channel couples the body channel to the output channel.

The choke system is to convey fluid through the body channel and the seat channel when the gate is open and fluid is pressurized in the input channel, and the choke system is to prevent the conveyance of fluid through the body channel and the seat channel when the gate is closed and the gate contacts the seat;

The input channel includes an entry and an exit, the input channel exit being between the body channel and the entry of the input channel. The entry of the input channel includes a first distance 1 that is a maximum diameter of the entry of the input channel, the first distance being between 4.5 and 5.5 inches.

The exit of the input channel includes an upper border and a lower border, the lower border of the input channel being between the upper border of the input channel and the output channel Second distance 2 is a minimum distance between the lower border of the exit of the input channel and the lower border of the gate when the gate is fully open, the second distance being greater than 3.75 inches.

When the gate is fully open the lower border of the gate is third distance 3 from the upper border of the seat channel, the third distance being greater than 4.25 inches.

The seat channel includes fourth distance 4 that is a maximum diameter of the seat channel and is between 3.6 and 4.4 inches, and the upper border of the seat channel is between the valve stem and the lower border of the seat channel.

First axis 920 includes a long axis of the valve stem. The first distance and the third distance are both parallel to the first axis; the fourth distance is orthogonal to the first axis; and the second distance is not parallel to the first axis and the second distance is not orthogonal to the first axis. No other passageway within any of the input channel, body channel, seat channel, or output channel is smaller than the second distance.

The choke system comprises first ring 915 between the seat and a center of the body channel. First ring may include seal 916 (e.g., O-ring). Second axis 923 is parallel to the first axis. The second axis intersects the seat, the first ring, and the body channel. The ring directly contacts both the seat and the choke body.

Figure 5A:
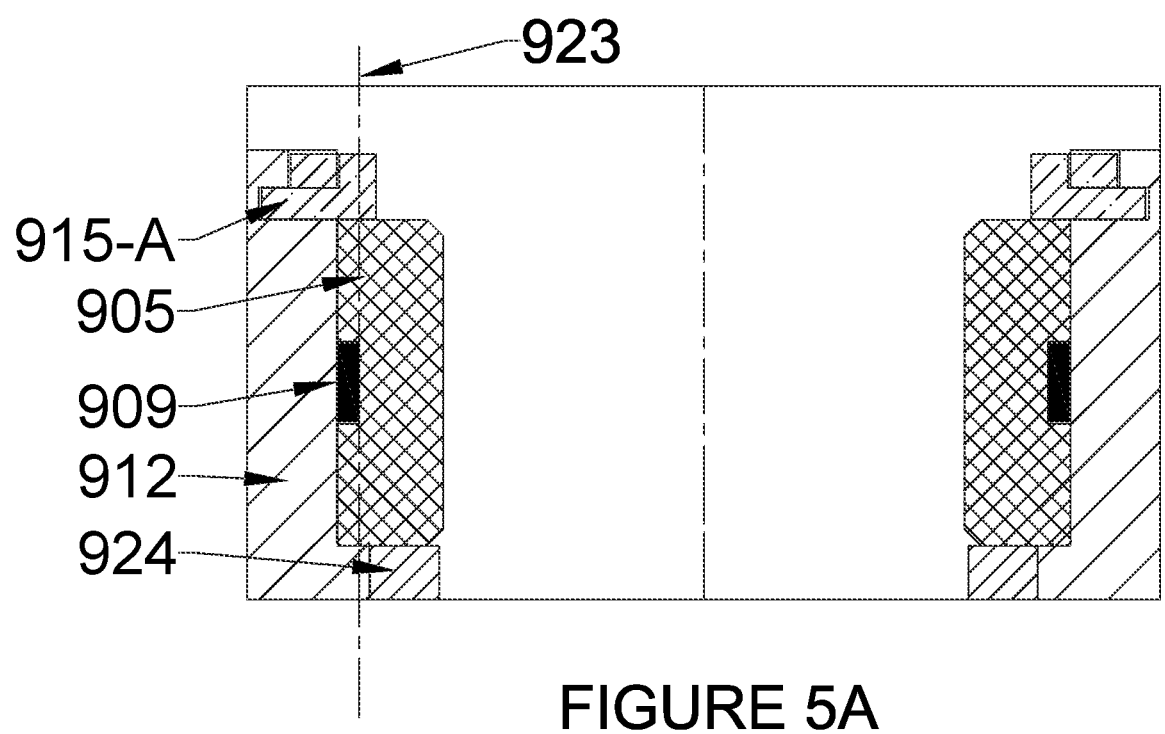
FIG. 5A is a cross-sectional side view of a seat and retaining ring in an embodiment.
Figure 5B:
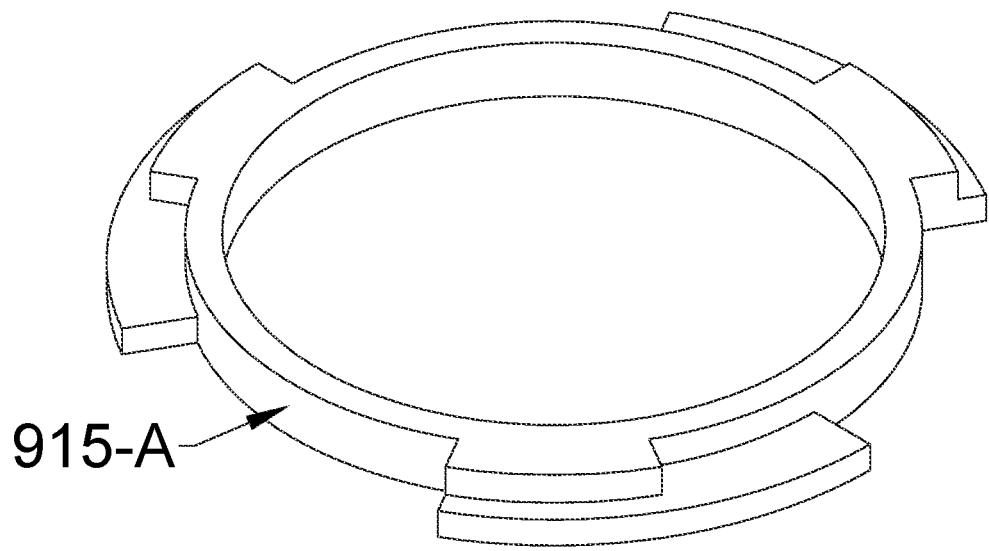
FIG. 5B is a perspective view of the retaining ring of FIG. 5A.
Figure 7:
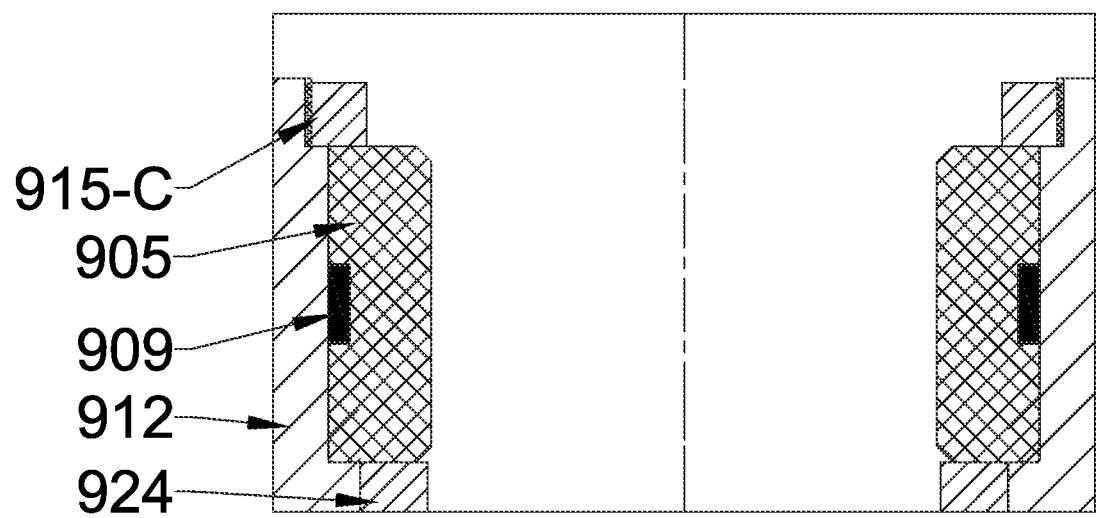
FIG. 7 is a cross-sectional side view of a seat and retaining ring in an embodiment.

In an embodiment, ring 915 couples to the body channel via at least one of a threaded coupling, an adhesive coupling, or combinations thereof. For example, FIG. 7 shows a threaded ring 915-C. In an embodiment the ring may include detents, probes, projections, recesses and the like that interface mating features of the choke body. For example, the ring may include projections that mate with recesses in the choke body to hold the ring in place. In some embodiments the ring is resilient and/or elastic so it can be deformed in order to secure the ring to the choke body. For example, FIG. 5A shows ring 915-A with a projection that extends under a ledge of body 912. Such a projection may extend along the entire perimeter of the ring. However, the projection may be 1 of a plurality of projections (e.g., 4 projections) that fit into recesses of body 912. Ring 915-A may be resilient. FIG. 5B shows an embodiment of ring 915-A. The ring may be severed in multiple locations to add with installing the ring.

Figure 6:
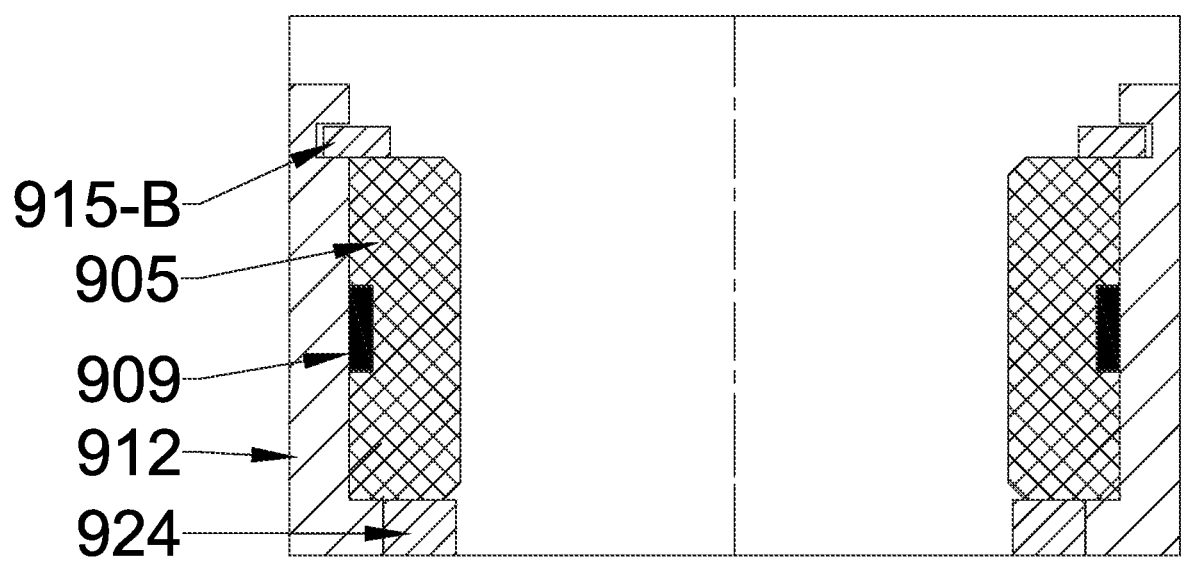
FIG. 6 is a cross-sectional side view of a seat and retaining ring in an embodiment.

In some embodiments the ring forms a complete, contiguous, monolithic circle. Such an embodiment may include a threaded version of the ring (such as FIG. 7). However, other versions of the ring may not form a complete, contiguous, monolithic circle. For example, such a version may include a snap ring or a retaining ring which has a break or gap in the ring. Such a ring may be compressable or resilient. FIG. 6 discloses snap ring 915-B.

The choke system comprises second ring 924, the second ring being a wear ring. A wear ring is a replaceable ring used to protect the choke body from abrasion caused by debris moving through channel 908. The choke system may also include third ring 902, with the second ring between the third ring and the seat. In an embodiment the third ring may be threaded such that the third ring is configured to force the second ring towards the seat in response to threading the third ring to the choke body. Further, the third ring is configured to force the seat towards the first ring in response to threading the third ring to the choke body.

Rings 915 and 902 may be used separately from each other or together with each other. In other words, some embodiments include ring 915 and ring 902 while others include ring 915 but not ring 902 while still others include ring 902 but not ring 915.

Ring 915 helps address a situation where backpressure being applied from channel 908 towards channel 906 may cause harm to choke components, such as the gate and/or gate stem, by forcing the seat up into or towards channel 906. Ring 915 forms a barrier to such movement of the seat.

Ring 902 helps prevent leaks of fluid between, for example, the seat and the choke body. For example, if ring 902 is threaded (male or female threads) then ring 902 can be threaded to the choke body moving ring 902 towards wear ring 924, thereby driving ring 924 towards seat 905, and driving seat 905 against ring 915. This system may couple with seal 909 to prevent leaks of fluid flowing to or from channel 906 between the seat and valve body (although some embodiments do not include seal 906). Further, the system is adjustable such that a longer wear ring may require ring 902 to only be threaded into the choke body a relatively small amount but a shorter wear ring may require ring 902 to be threaded/advanced into the choke body a relatively longer amount. Thus, various sizes of seats and/or wear rings are easily accommodated by advancing ring 902 variable amounts towards channel 906 until ring 902 forcibly holds ring 924, seat 905, and ring 915 together to limit leaking.

Another benefit for ring 902 is a decrease in vibrations of the choke system. For instance, using ring 902 to tighten the wear ring against the seat (and, in some cases, the seat against ring 915) reduces vibrations of the choke system.

Figure 2:
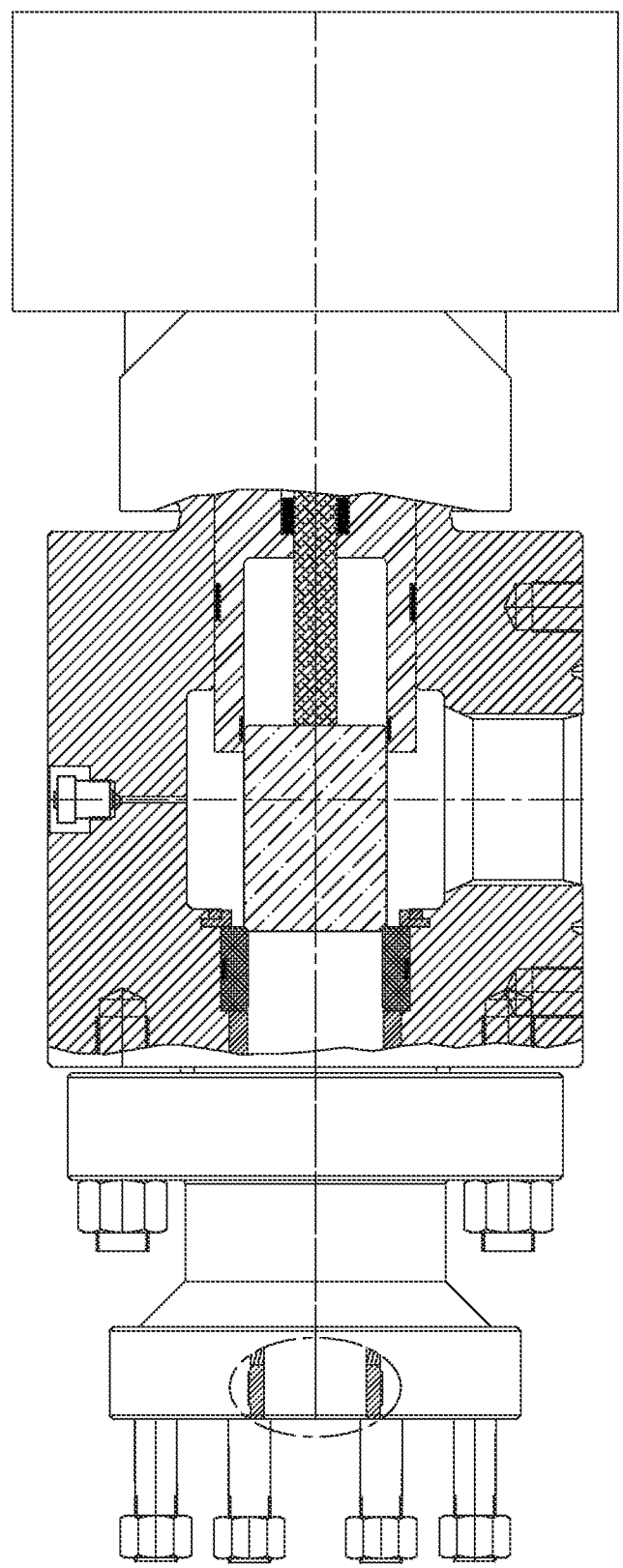
FIG. 2 is a cross-sectional side view of the choke system of FIG. 1 at a 100% fully closed configuration.
Figure 3:
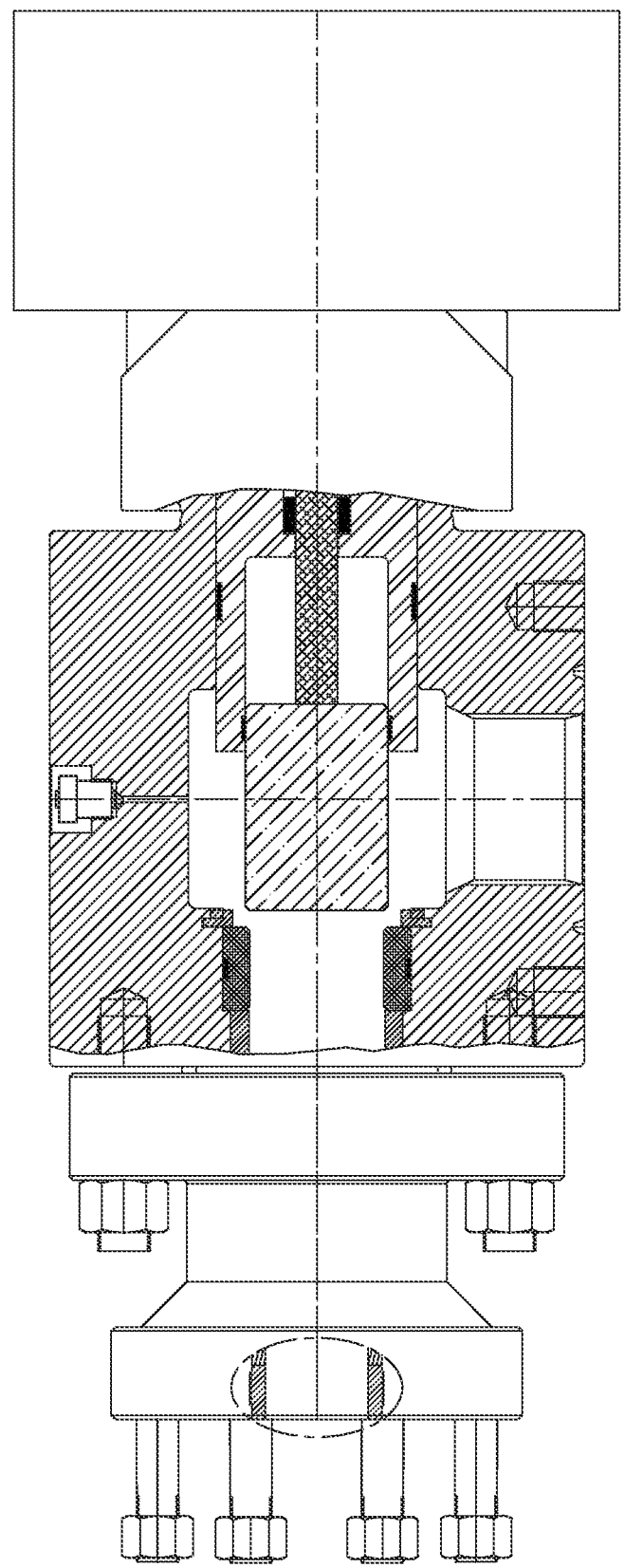
FIG. 3 is a cross-sectional side view of the choke system of FIG. 1 at a 90% closed configuration.
Figure 4:
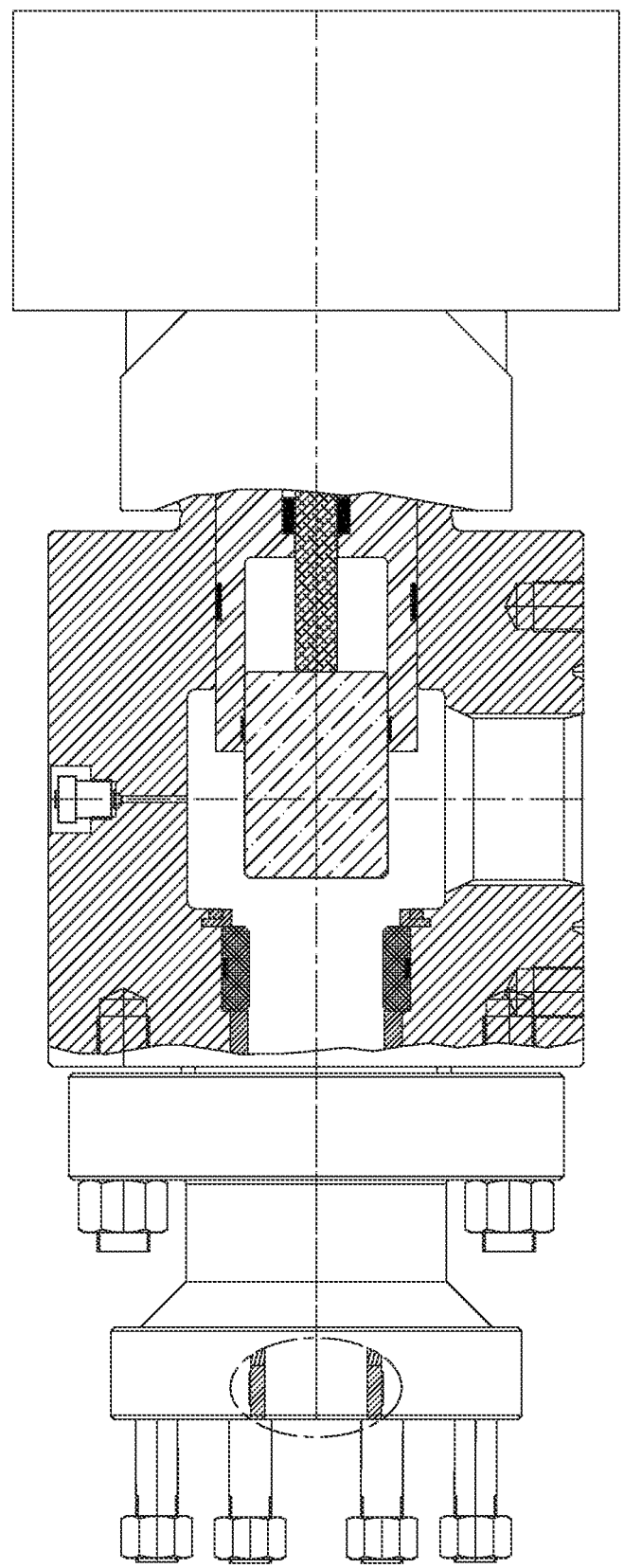
FIG. 4 is a cross-sectional side view of the choke system of FIG. 1 at a 70% closed configuration.

Ring 915 and ring 902 are especially effective in certain scenarios. For example, FIG. 2 shows the gate fully closed. As such, the gate puts downward pressure on the seat and, in some configurations, some pressure on seal 909. Consequently, in FIG. 2 ring 915 may not provide much of a blocking force to seat (where the seat may be subjected to backpressure from channel 908) considering the gate itself is acting to prevent the seat from moving towards channel 906. However, FIGS. 3 and 4 respectively show the gate rising to 90% closed and 70% closed such that the gate does not place downward pressure on the seat to the extent it did in FIG. 2. Applicant determined the "slightly open" choke presents a problem such that backpressure from channel 908 towards channel 906 can damage internal choke components. Specifically, Applicant determined in FIGS. 3 and 4 there may be significant upward pressure on the seat (supplied by back pressure in channel 908) pushing fluid towards channel 906. In such a scenario and to address the identified problem, ring 915 is used to resist movement of the seat towards channel 906 and rings 915 and/or 902 place pressure on the interface between wear ring 924 and the seat (and between the seat and ring 915), thereby resisting leaks, such as leaks along the interface between the wear ring and seat, the interface between the seat and ring 915, and/or the interface between the seat and body 912.

Regarding seal 909, in some embodiments seal 909 may include a one-way seal between the seat and the choke body. The seal may be configured to allow fluid to flow from the outlet channel to the body channel but disallow fluid to flow from the body channel to the outlet channel Seal 909 helps address a situation where the choke is closed and backpressure is applied from channel 908 towards channel 906. Such backpressure may cause harm and physical damage to choke components (such as the gate, gate stem, and/or actuator parts) by applying high load forces against the gate, which in turn causes the high load force to be transferred to the components behind the gate. This activity may render the choke inactive for operation leading to unsafe operating conditions and rig downtime (NPT). However, unidirectional seal 909 allows fluid pressure from outlet channel 908 to bleed or disperse to body channel 906 to significantly lower the loads against the gate and other components behind gate, thereby preventing or lessening harm to choke components and/or personnel and lowering rig downtime.

Figure 10:
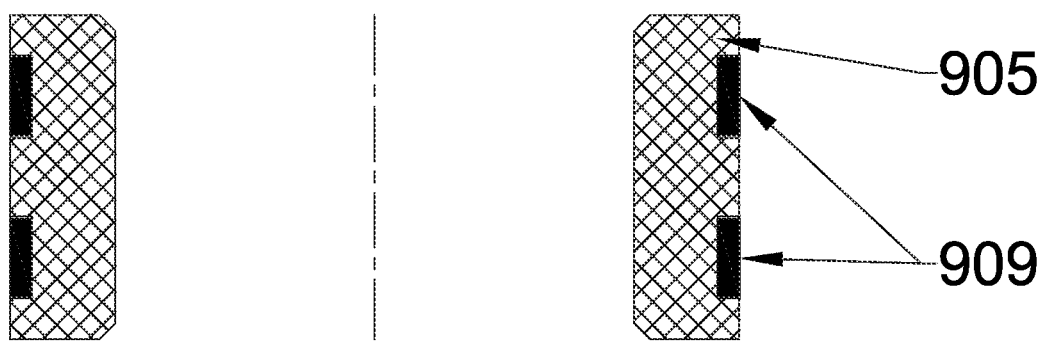
FIG. 10 includes an embodiment of a seat and corresponding seal system.

Seal 909 may include, for example, a "U-cup" seal. This type of seal may also be referred to as a lipped seal. The U-cup is a unidirectional seal as it only seals (or primarily seals) in one direction. When installed the U lips are deflected, and there is typically no solid compression band. The system pressure energizes the seal lips to create the primary seal. Because the U-cup is pressure energized, the seal can be made with a harder, high modulus seal material that has excellent abrasion and wear resistance. Such a unidirectional seal is in contrast to, for example, an O-ring (which is bidirectional). However, some embodiments may use bi-directional seals (e.g., one or more O-rings) for seal 909. In an embodiment, there are multiple seals along the outer diameter of the seat. Further, FIG. 5A shows seal 909 included within a groove on the outer surface of the seat. In some embodiments there may be multiple seals in a single groove and/or there may be multiple grooves on the outer wall of the seat. See, for example, FIG. 10.

A version of the choke system of FIG. 1 may not require any specific dimensions, yet still provide advancements over conventional choke systems. Such a choke system may include choke body 912 including input channel 907, body channel 906, and output channel 908. Seat 605 includes seat channel 914, the seat channel including an upper border and a lower border. Gate 904 has an upper border and a lower border, the lower border of the gate being configured to engage the seat when the gate is fully closed to block fluid flow through the seat channel. Valve stem 913 is coupled to a top surface of the gate. First ring 915 is between the seat and a center of the body channel. The body channel couples the input channel to the seat channel, and the seat channel couples the body channel to the output channel. The choke system is to convey fluid through the body channel and the seat channel when the gate is open and fluid is pressurized in the input channel. The choke system is to prevent the conveyance of fluid through the body channel and the seat channel when the gate is closed and the gate contacts the seat. The input channel includes an entry and an exit, the input channel exit being between the body channel and the entry of the input channel. The entry of the input channel includes first distance 1 that is a maximum diameter of the entry of the input channel. The exit of the input channel includes an upper border and a lower border, the lower border of the input channel being between the upper border of the input channel and the output channel Second distance 2 is a minimum distance between the lower border of the exit of the input channel and the lower border of the gate when the gate is fully open. When the gate is fully open the lower border of the gate is third distance 3 from the upper border of the seat channel. The seat channel includes fourth distance 4 that is a maximum diameter of the seat channel. The upper border of the seat channel is between the valve stem and the lower border of the seat channel. First axis 920 includes a long axis of the valve stem. Second axis 923 is parallel to the first axis and the second axis intersects the seat, the first ring, and the body channel. However, in some embodiments the body channel may be formed such that axis 925 does not intersect the body channel. In an embedment ring 915 directly contacts both the seat and the choke body.

The choke system may include second ring 924, the second ring being a wear ring, and third ring 902 wherein the second ring is between the third ring and the seat. The third ring may be threaded and the third ring is configured to force the second ring towards the seat in response to threading the third ring to the choke body and be further configured to force the seat towards the first ring in response to threading the third ring to the choke body.

As used herein, rings are not necessarily complete contiguous rings and instead may include a gap or the like. Rings are not necessarily circular and may have a rectilinear shape and the like.

Another embodiment includes a choke system comprising a choke body including an input channel, a body channel, and an output channel; a seat including a seat channel, the seat channel including an upper border and a lower border; a gate having an upper border and a lower border, the lower border of the gate being configured to engage the seat when the gate is fully closed to block fluid flow through the seat channel; and a valve stem coupled to a top surface of the gate; wherein (a) the body channel couples the input channel to the seat channel, and (b) the seat channel couples the body channel to the output channel; wherein (a) the choke system is to convey fluid through the body channel and the seat channel when the gate is open and fluid is pressurized in the input channel, and (b) the choke system is to prevent the conveyance of fluid through the body channel and the seat channel when the gate is closed and the gate contacts the seat; wherein (a) the input channel includes an entry and an exit, the input channel exit being between the body channel and the entry of the input channel, (b) the entry of the input channel includes a first distance that is a maximum diameter of the entry of the input channel, the first distance being between 4.5 and 5.5 inches; wherein (a) the exit of the input channel includes an upper border and a lower border, the lower border of the input channel being between the upper border of the input channel and the output channel, (b) a second distance is a minimum distance between the lower border of the exit of the input channel and the lower border of the gate when the gate is fully open, the second distance being greater than 3.75 inches and wherein no other passageway within any of the input channel, the body channel, the seat channel, or the output channel is smaller than the second distance; wherein when the gate is fully open the lower-most surface of the gate is a third distance from an uppermost surface of the seat, the third distance being greater than 4.25 inches; and wherein (a) the seat channel includes a fourth distance that is a maximum diameter of the seat channel and is between 3.6 and 4.4 inches, and (b) the upper border of the seat channel is between the valve stem and the lower border of the seat channel.

Some embodiments do not include some or all of the rings shown in FIG. 1. For example, an embodiment includes a choke system comprising: a choke body including an input channel, a body channel, and an output channel; a seat including a seat channel, the seat channel including an upper border and a lower border; a gate having an upper border and a lower border, the lower border of the gate being configured to engage the seat when the gate is fully closed to block fluid flow through the seat channel; a valve stem coupled to a top surface of the gate; and a first retainer between the seat and a center of the body channel; wherein (a) the body channel couples the input channel to the seat channel, and (b) the seat channel couples the body channel to the output channel; wherein (a) the choke system is to convey fluid through the body channel and the seat channel when the gate is open and fluid is pressurized in the input channel, and (b) the choke system is to prevent the conveyance of fluid through the body channel and the seat channel when the gate is closed and the gate contacts the seat; wherein (a) the input channel includes an entry and an exit, the input channel exit being between the body channel and the entry of the input channel, (b) the entry of the input channel includes a first distance that is a maximum diameter of the entry of the input channel; wherein (a) the exit of the input channel includes an upper border and a lower border, the lower border of the input channel being between the upper border of the input channel and the output channel, (b) a second distance is a minimum distance between the lower border of the exit of the input channel and the lower border of the gate when the gate is fully open; wherein when the gate is fully open the lower border of the gate is a third distance from the upper border of the seat channel; wherein (a) the seat channel includes a fourth distance that is a maximum diameter of the seat channel, and (b) the upper border of the seat channel is between the valve stem and the lower border of the seat channel; and wherein (a) a first axis includes a long axis of the valve stem, and (b) a second axis is parallel to the first axis and the second axis intersects the seat, the first retainer, and the body channel. In such an embodiment the first retainer directly contacts both the seat and the choke body. Such an embodiment may include a wear ring; and a second retainer, wherein the wear ring is between the second retainer and the seat. In such an embodiment the second retainer is configured to force the wear ring towards the seat in response to advancing the second retainer towards the seat. In such an embodiment the second retainer is configured to force the seat towards the first retainer in response to advancing the second retainer towards the seat. In such an embodiment, the first distance is between 4.5 and 5.5 inches, the second distance is greater than 3.75 inches, the third distance is greater than 4.25 inches, and the fourth distance is between 3.6 and 4.4 inches; the first distance and the third distance are both parallel to the first axis; the fourth distance is orthogonal to the first axis; the second distance is not parallel to the first axis and the second distance is not orthogonal to the first axis.

The first and/or second retainer may include a bar or bars, rod or rods, plate or plates, fastener or fasteners (e.g., screws, bolts), and the like.

Some embodiments include a choke system comprising: a choke body including an input channel, a body channel, and an output channel; a seat including a seat channel, the seat channel including an upper border and a lower border; a gate having an upper border and a lower border, the lower border of the gate being configured to engage the seat when the gate is fully closed to block fluid flow through the seat channel; a valve stem coupled to a top surface of the gate; and a means for retaining the seat between the seat and a center of the body channel; wherein (a) the body channel couples the input channel to the seat channel, and (b) the seat channel couples the body channel to the output channel; wherein (a) the choke system is to convey fluid through the body channel and the seat channel when the gate is open and fluid is pressurized in the input channel, and (b) the choke system is to prevent the conveyance of fluid through the body channel and the seat channel when the gate is closed and the gate contacts the seat; wherein (a) the input channel includes an entry and an exit, the input channel exit being between the body channel and the entry of the input channel, (b) the entry of the input channel includes a first distance that is a maximum diameter of the entry of the input channel; wherein (a) the exit of the input channel includes an upper border and a lower border, the lower border of the input channel being between the upper border of the input channel and the output channel, (b) a second distance is a minimum distance between the lower border of the exit of the input channel and the lower border of the gate when the gate is fully open; wherein when the gate is fully open the lower border of the gate is a third distance from the upper border of the seat channel; wherein (a) the seat channel includes a fourth distance that is a maximum diameter of the seat channel, and (b) the upper border of the seat channel is between the valve stem and the lower border of the seat channel; and wherein (a) a first axis includes a long axis of the valve stem, and (b) a second axis is parallel to the first axis and the second axis intersects the seat, the means for retaining the seat, and the body channel. In such an embodiment the means for retaining the seat directly contacts both the seat and the choke body. Such an embodiment may include a wear ring; and a means for compressing the wear ring; wherein the wear ring is between the means for compressing the wear ring and the seat. In such an embodiment the means for compressing the wear ring is configured to force the wear ring towards the seat in response to advancing the means for compressing the wear ring towards the seat. In such an embodiment the means for compressing the wear ring is configured to force the seat towards the means for retaining the seat in response to advancing the means for compressing the wear ring towards the seat. In such an embodiment, the first distance is between 4.5 and 5.5 inches, the second distance is greater than 3.75 inches, the third distance is greater than 4.25 inches, and the fourth distance is between 3.6 and 4.4 inches; the first distance and the third distance are both parallel to the first axis; the fourth distance is orthogonal to the first axis; the second distance is not parallel to the first axis and the second distance is not orthogonal to the first axis.

An embodiment includes a choke system with a threaded seat. For example, in FIG. 8A seat 905' couples to the body channel via a threaded coupling. In some embodiments, the threaded nature of the coupling removes the need for a ring such as ring 915 of FIG. 1 (but other embodiments may include a threaded seat and a retainer ring such as ring 915). In such embodiments, threaded seat 905' helps address a situation where backpressure being applied from channel 908 (see FIG. 1) towards channel 906 (see FIG. 1) may cause harm to choke components, such as the gate and/or gate stem, by forcing the seat up into or towards channel 906. The threads of seat 905' form a barrier to such movement of the seat.

Figure 8A:
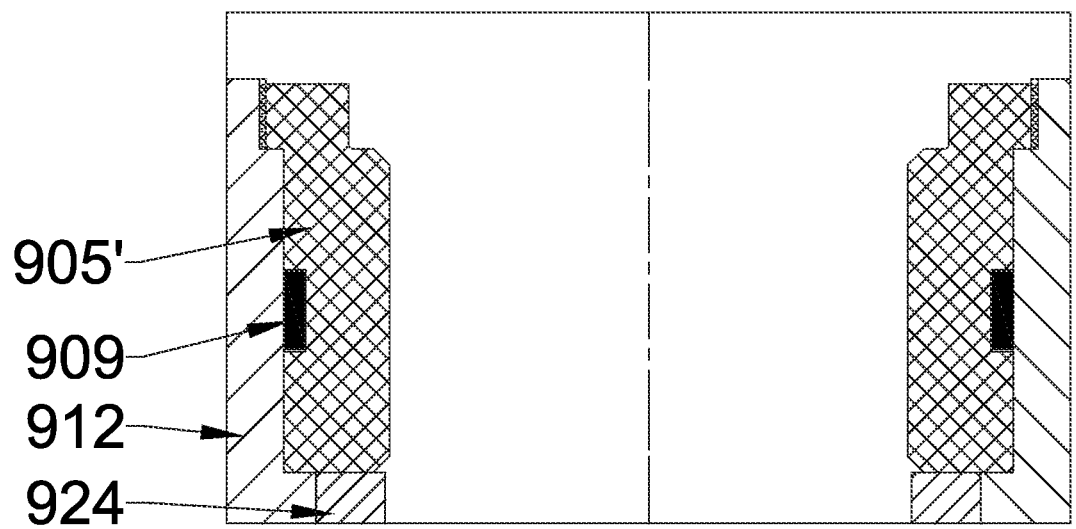
FIG. 8A includes an embodiment of a threaded seat.

A threaded seat may operate without other rings such as ring 902 (see FIG. 1) or with rings such as ring 902, 924. In the embodiment of FIG. 8A, ring 902 helps prevent leaks of fluid between, for example, the seat and the choke body. For example, if ring 902 is threaded (male or female threads) then ring 902 can be threaded to the choke body moving ring 902 towards wear ring 924, thereby driving ring 924 towards constrained seat 905'. This system may couple with seal 909 to prevent leaks of fluid flowing to or from channel 906 between the seat and valve body 912 (although some embodiments do not include seal 906). Further, the system is adjustable such that a longer wear ring may require ring 902 to only be threaded into the choke body a relatively small amount but a shorter wear ring may require ring 902 to be threaded/advanced into the choke body a relatively longer amount. Thus, various sizes of seats and/or wear rings are easily accommodated by advancing ring 902 variable amounts towards channel 906 until ring 902 forcibly holds ring 924 and seat 905' together to limit leaking.

Figure 8B:
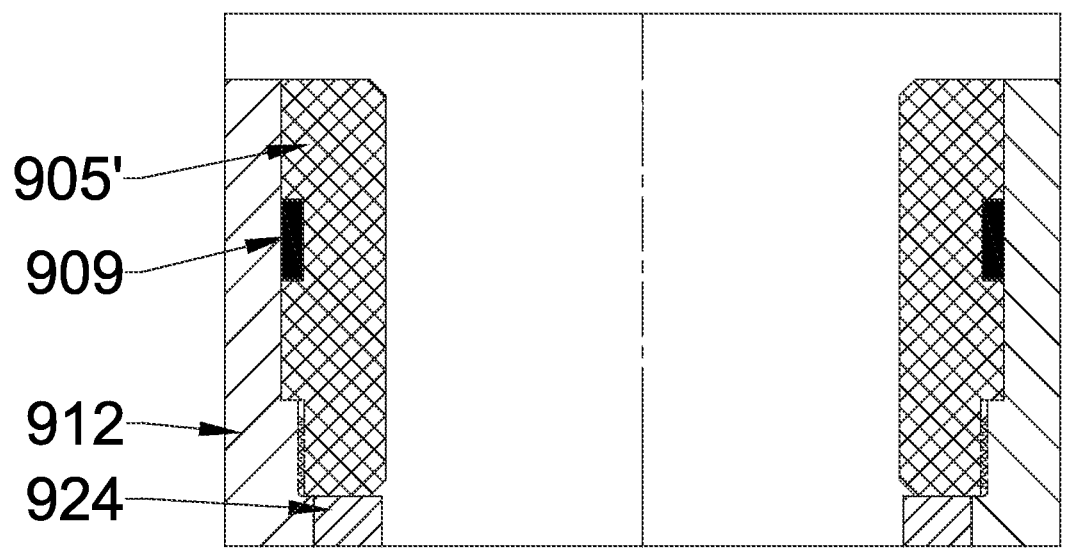
FIG. 8B includes an embodiment of a threaded seat.

FIG. 8B is an embodiment similar to FIG. 8A but with threads in a different location for the seat.

In an embodiment, seat 905' may be substituted for seat 905 of FIG. 1 with other elements of FIG. 1 (e.g., elements 913, 928, 904, etc.) serving their same roles as described above. These elements, for the sake of brevity, are not described again.

Embodiments addressed herein may be utilized in various situations including, for example, situations where debris clearance critical or highly useful. Such situations include, for example, managed pressure drilling (MPD) applications where the choke is a critical component of the overall drilling system. Useful situations include, generally, situations where backpressure is encountered, such as drilling, well control, MPD, flowback, hydraulic fracturing ("fracking"), and other applications where a choke is typically used The following are still further examples or embodiments.

At least five aspects are described above including (1) dimensions of various system components configured to pass large debris yet limit the size of the intake port, (2) rings or retainer systems to keep seat from being pressured into the main choke chamber due to backpressure, (3) rings or retainer systems to forced the wear ring against the seat to limit leaks, (4) one-way seals for the seat, and (5) a threaded seat. Embodiments include systems that include (1), only include (2), only include (3), only include (4), only include (5), or include a combination of two or more of (1), (2), (3), (4), and (5).

For example, an embodiment may include the dimensions of (1) along with rings 2 and 3 (3). An embodiment may include rings 1, 2, and 3 but not require the dimensions of (1).

Example 1. A choke system comprising: a choke body including an input channel, a body channel, and an output channel; a seat including a seat channel, the seat channel including an upper border and a lower border; a gate having an upper border and a lower border, the lower border of the gate being configured to engage the seat when the gate is fully closed to block fluid flow through the seat channel; and a valve stem coupled to a top surface of the gate; wherein (a) the body channel couples the input channel to the seat channel, and (b) the seat channel couples the body channel to the output channel; wherein (a) the choke system is to convey fluid through the body channel and the seat channel when the gate is open and fluid is pressurized in the input channel, and (b) the choke system is to prevent the conveyance of fluid through the body channel and the seat channel when the gate is closed and the gate contacts the seat; wherein (a) the input channel includes an entry and an exit, the input channel exit being between the body channel and the entry of the input channel, (b) the entry of the input channel includes a first distance that is a maximum diameter of the entry of the input channel, the first distance being between 4.5 and 5.5 inches; wherein (a) the exit of the input channel includes an upper border and a lower border, the lower border of the input channel being between the upper border of the input channel and the output channel, (b) a second distance is a minimum distance between the lower border of the exit of the input channel and the lower border of the gate when the gate is fully open, the second distance being greater than 3.75 inches; wherein when the gate is fully open the lower border of the gate is a third distance from the upper border of the seat channel, the third distance being greater than 4.25 inches; and wherein (a) the seat channel includes a fourth distance that is a maximum diameter of the seat channel and is between 3.6 and 4.4 inches, and (b) the upper border of the seat channel is between the valve stem and the lower border of the seat channel.

Example 2. The system of example 1, wherein: a first axis includes a long axis of the valve stem; the first distance and the third distance are both parallel to the first axis; the fourth distance is orthogonal to the first axis; and the second distance is not parallel to the first axis and the second distance is not orthogonal to the first axis.

Example 3. The system according to any examples 1-2, wherein no other passageway within any of the input channel, body channel, seat channel, or output channel is smaller than the second distance.

Example 4. The system according to any examples 1-3, comprising a first ring between the seat and a center of the body channel, wherein: a second axis is parallel to the first axis; and the second axis intersects the seat, the first ring, and the body channel.

Example 5. The system of example 4, wherein the first ring directly contacts both the seat and the choke body.

Example 6. The system according to any examples 4-5, wherein the first ring couples to the body channel via at least one of a threaded coupling, an adhesive coupling, or combinations thereof.

Example 7. The system according to any examples 4-6, comprising: a second ring, the second ring being a wear ring; and a third ring; wherein the second ring is between the third ring and the seat.

Example 8. The system of example 7, wherein the third ring is threaded.

Example 9. The system according to any examples 7-8, wherein the third ring is configured to force the second ring towards the seat in response to threading the third ring to the choke body and towards the seat.

Example 10. The system according to any examples 7-9, wherein the third ring is configured to force the seat towards the first ring in response to threading the third ring to the choke body and towards the seat.

Example 11. The system according to any examples 1-10, wherein the seat is unthreaded.

Example 12. The system according to any examples 1-10, wherein the seat is threaded.

Example 13. The system according to any examples 1-12, comprising: a one-way seal between the seat and the choke body; wherein the one-way seal is configured to allow fluid to flow from the outlet channel to the body channel but is further configured to disallow fluid to flow from the body channel to the outlet channel.

Example 15. The system according to any examples 1-14, comprising: a valve stem extension; and a stem coupling that couples the valve stem extension to the valve stem; wherein: the valve stem includes an upper end and a lower end, the lower end of the valve stem being between the upper end of the valve stem and the gate; the valve stem extension includes an upper end and a lower end, the lower end of the valve stem extension being between the upper end of the valve stem extension and the gate; and the stem coupling is not threaded.

Example 16. The system of example 15, wherein: a second axis is parallel to the first axis; the second axis intersects the upper end of the valve stem at a first location and the lower end of the valve stem extension at second and third locations; and the first location is between the second and third locations.

Example 17. The system of example 15, wherein: a second axis is parallel to the first axis; the second axis intersects the lower end of the valve stem extension at a first location and the upper end of the valve stem at second and third locations; and the first location is between the second and third locations.

Example 18. The system according to any examples 1-17, wherein the first distance is 5 inches.

Example 19. The system according to any examples 13-18, wherein the seat is threaded.

Example 20. A choke system comprising: a choke body including an input channel, a body channel, and an output channel; a seat including a seat channel, the seat channel including an upper border and a lower border; a gate having an upper border and a lower border, the lower border of the gate being configured to engage the seat when the gate is fully closed to block fluid flow through the seat channel; a valve stem coupled to a top surface of the gate; and a first ring between the seat and a center of the body channel; wherein (a) the body channel couples the input channel to the seat channel, and (b) the seat channel couples the body channel to the output channel; wherein (a) the choke system is to convey fluid through the body channel and the seat channel when the gate is open and fluid is pressurized in the input channel, and (b) the choke system is to prevent the conveyance of fluid through the body channel and the seat channel when the gate is closed and the gate contacts the seat; wherein (a) the input channel includes an entry and an exit, the input channel exit being between the body channel and the entry of the input channel, (b) the entry of the input channel includes a first distance that is a maximum diameter of the entry of the input channel; wherein (a) the exit of the input channel includes an upper border and a lower border, the lower border of the input channel being between the upper border of the input channel and the output channel, (b) a second distance is a minimum distance between the lower border of the exit of the input channel and the lower border of the gate when the gate is fully open; wherein when the gate is fully open the lower border of the gate is a third distance from the upper border of the seat channel; wherein (a) the seat channel includes a fourth distance that is a maximum diameter of the seat channel, and (b) the upper border of the seat channel is between the valve stem and the lower border of the seat channel; and wherein (a) a first axis includes a long axis of the valve stem, and (b) a second axis is parallel to the first axis and the second axis intersects the seat, the first ring, and the body channel.

Example 21. The system of example 20, wherein the first ring directly contacts both the seat and the choke body.

Example 22. The system according to any examples 20-21, comprising: a second ring, the second ring being a wear ring; and a third ring; wherein the second ring is between the third ring and the seat.

Example 23. The system of example 22, wherein: the third ring is threaded; and the third ring is configured to force the second ring towards the seat in response to threading the third ring to the choke body and towards the seat.

Example 24. The system according to any examples 22-23, wherein the third ring is configured to force the seat towards the first ring in response to threading the third ring to the choke body and towards the seat.

Example 25. The system according to any examples 20-24, wherein: the first distance is between 4.5 and 5.5 inches, the second distance is greater than 3.75 inches, the third distance is greater than 4.25 inches, and the fourth distance is between 3.6 and 4.4 inches; the first distance and the third distance are both parallel to the first axis; the fourth distance is orthogonal to the first axis; the second distance is not parallel to the first axis and the second distance is not orthogonal to the first axis; and no other passageway within any of the input channel, body channel, seat channel, or output channel is smaller than the second distance.

Example 26. The system according to any examples 20-25, wherein the seat is threaded.

The foregoing description of the embodiments of the invention has been presented for the purposes of illustration and description. It is not intended to be exhaustive or to limit the invention to the precise forms disclosed. This description and the claims following include terms, such as left, right, top, bottom, over, under, upper, lower, first, second, etc. that are used for descriptive purposes only and are not to be construed as limiting. For example, terms designating relative vertical position refer to a situation where a device side is the "top" surface of that device; the device may actually be in any orientation so that a "top" side of a substrate may be lower than the "bottom" side in a standard terrestrial frame of reference and still fall within the meaning of the term "top." The embodiments of a device or article described herein can be manufactured, used, or shipped in a number of positions and orientations. Persons skilled in the relevant art can appreciate that many modifications and variations are possible in light of the above teaching. Persons skilled in the art will recognize various equivalent combinations and substitutions for various components shown in the Figures. It is therefore intended that the scope of the invention be limited not by this detailed description, but rather by the claims appended hereto.

What is claimed is:

1. A choke system comprising:
a choke body including an input channel, a body channel, and an output channel;
a seat including a seat channel, the seat channel including an upper border and a lower border;
a gate having an upper border and a lower border, the lower border of the gate being configured to engage the seat when the gate is fully closed to block fluid flow through the seat channel;
a valve stem coupled to a top surface of the gate; and
a one-way seal between the seat and the choke body;
wherein (a) the body channel couples the input channel to the seat channel, and (b) the seat channel couples the body channel to the output channel;
wherein (a) the choke system is to convey fluid through the body channel and the seat channel when the gate is open and fluid is pressurized in the input channel, and (b) the choke system is to prevent conveyance of fluid through the body channel and the seat channel when the gate is closed and the gate contacts the seat;
wherein (a) the input channel includes an entry and an exit, the input channel exit being between the body channel and the entry of the input channel, (b) the entry of the input channel includes a first distance that is a maximum diameter of the entry of the input channel, the first distance being between 4.5 and 5.5 inches;
wherein (a) the exit of the input channel includes an upper border and a lower border, the lower border of the exit of the input channel being between the upper border of the exit of the input channel and the output channel, (b) a second distance is a minimum distance between the lower border of the exit of the input channel and the lower border of the gate when the gate is fully open, the second distance being greater than 3.75 inches;
wherein when the gate is fully open the lower border of the gate is a third distance from the upper border of the seat channel, the third distance being greater than 4.25 inches; and
wherein (a) the seat channel includes a fourth distance that is a maximum diameter of the seat channel and is between 3.6 and 4.4 inches, and (b) the upper border of the seat channel is between the valve stem and the lower border of the seat channel;
wherein the one-way seal is configured to allow fluid to flow from the output channel to the body channel but is further configured to disallow fluid to flow from the body channel to the output channel.

2. The system of claim 1, wherein:
a first axis includes a long axis of the valve stem;
the first distance and the third distance are both parallel to the first axis;
the fourth distance is orthogonal to the first axis; and
the second distance is not parallel to the first axis and the second distance is not orthogonal to the first axis.

3. The system of claim 2, wherein no other passageway within any of the input channel, the body channel, the seat channel, or the output channel is smaller than the second distance.

4. The system of claim 2, comprising a first ring between the seat and a center of the body channel, wherein:
a second axis is parallel to the first axis; and
the second axis intersects the seat, the first ring, and the body channel.

5. The system of claim 4, wherein the first ring directly contacts both the seat and the choke body.

6. The system of claim 4, wherein the first ring couples to the body channel via at least one of a threaded coupling, an adhesive coupling, or combinations thereof.

7. The system of claim 4, comprising:
a second ring, the second ring being a wear ring; and
a third ring;
wherein the second ring is between the third ring and the seat.

8. The system of claim 7, wherein the third ring is threaded.

9. The system of claim 8, wherein the third ring is configured to force the second ring towards the seat in response to threading the third ring to the choke body and towards the seat.

10. The system of claim 9, wherein the third ring is configured to force the seat towards the first ring in response to threading the third ring to the choke body and towards the seat.

11. The system of claim 10, wherein the seat is unthreaded.

12. The system of claim 10, wherein the seat is threaded.

13. The system of claim 2, comprising:
a valve stem extension; and
a stem coupling that couples the valve stem extension to the valve stem;
wherein:
the valve stem includes an upper end and a lower end, the lower end of the valve stem being between the upper end of the valve stem and the gate;
the valve stem extension includes an upper end and a lower end, the lower end of the valve stem extension being between the upper end of the valve stem extension and the gate; and
the stem coupling is not threaded.

14. The system of claim 13, wherein:
a second axis is parallel to the first axis;
the second axis intersects the upper end of the valve stem at a first location and the lower end of the valve stem extension at second and third locations; and
the first location is between the second and third locations.

15. The system of claim 13, wherein:
a second axis is parallel to the first axis;
the second axis intersects the lower end of the valve stem extension at a first location and the upper end of the valve stem at second and third locations; and
the first location is between the second and third locations.

16. The system of claim 2, wherein the first distance is 5 inches.

17. The system of claim 2, wherein the seat is threaded.

18. A choke system comprising:
a choke body including an input channel, a body channel, and an output channel;
a seat including a seat channel, the seat channel including an upper border and a lower border;
a gate having an upper border and a lower border, the lower border of the gate being configured to engage the seat when the gate is fully closed to block fluid flow through the seat channel;
a valve stem coupled to a top surface of the gate;
a first ring between the seat and a center of the body channel; and
a one-way seal between the seat and the choke body;
wherein (a) the body channel couples the input channel to the seat channel, and (b) the seat channel couples the body channel to the output channel;
wherein (a) the choke system is to convey fluid through the body channel and the seat channel when the gate is open and fluid is pressurized in the input channel, and (b) the choke system is to prevent conveyance of fluid through the body channel and the seat channel when the gate is closed and the gate contacts the seat;
wherein (a) the input channel includes an entry and an exit, the input channel exit being between the body channel and the entry of the input channel, (b) the entry of the input channel includes a first distance that is a maximum diameter of the entry of the input channel;
wherein (a) the exit of the input channel includes an upper border and a lower border, the lower border of the exit of the input channel being between the upper border of the exit of the input channel and the output channel, (b) a second distance is a minimum distance between the lower border of the exit of the input channel and the lower border of the gate when the gate is fully open;
wherein when the gate is fully open the lower border of the gate is a third distance from the upper border of the seat channel;
wherein (a) the seat channel includes a fourth distance that is a maximum diameter of the seat channel, and (b) the upper border of the seat channel is between the valve stem and the lower border of the seat channel; and
wherein the one-way seal is configured to allow fluid to flow from the output channel to the body channel but is further configured to disallow fluid to flow from the body channel to the output channel.

19. The system of claim 18, wherein the first ring directly contacts both the seat and the choke body.

20. The system of claim 18, comprising:
a second ring, the second ring being a wear ring; and
a third ring;
wherein the second ring is between the third ring and the seat.

21. The system of claim 20, wherein:
the third ring is threaded; and
the third ring is configured to force the second ring towards the seat in response to threading the third ring to the choke body and towards the seat.

22. The system of claim 21, wherein the third ring is configured to force the seat towards the first ring in response to threading the third ring to the choke body and towards the seat.

23. The system of claim 22, wherein:
the first distance is between 4.5 and 5.5 inches, the second distance is greater than 3.75 inches, the third distance is greater than 4.25 inches, and the fourth distance is between 3.6 and 4.4 inches;
a first axis includes a long axis of the valve stem;
the first distance and the third distance are both parallel to the first axis;
the fourth distance is orthogonal to the first axis;
the second distance is not parallel to the first axis and the second distance is not orthogonal to the first axis; and
no other passageway within any of the input channel, the body channel, the seat channel, or the output channel is smaller than the second distance.

24. The system of claim 18, wherein the seat is threaded.

25. The system of claim 18, wherein (a) a first axis includes a long axis of the valve stem, and (b) a second axis is parallel to the first axis and the second axis intersects the seat, the first ring, and the body channel.

* * * * *